(12) United States Patent
Minami et al.

(10) Patent No.: US 12,007,405 B2
(45) Date of Patent: Jun. 11, 2024

(54) MATERIAL ANALYSIS METHOD AND MATERIAL ANALYSIS APPARATUS

(71) Applicant: NATIONAL INSTITUTE FOR MATERIALS SCIENCE, Ibaraki (JP)

(72) Inventors: Kosuke Minami, Ibaraki (JP); Genki Yoshikawa, Ibaraki (JP); Gaku Imamura, Ibaraki (JP); Kota Shiba, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 727 days.

(21) Appl. No.: 17/055,687

(22) PCT Filed: Jun. 4, 2019

(86) PCT No.: PCT/JP2019/022080
§ 371 (c)(1),
(2) Date: Nov. 16, 2020

(87) PCT Pub. No.: WO2019/239950
PCT Pub. Date: Dec. 19, 2019

(65) Prior Publication Data
US 2021/0190655 A1 Jun. 24, 2021

(30) Foreign Application Priority Data
Jun. 11, 2018 (JP) ................. 2018-111344

(51) Int. Cl.
*G01N 5/02* (2006.01)
*G06N 5/04* (2023.01)
*G06N 20/00* (2019.01)

(52) U.S. Cl.
CPC ................. *G01N 5/02* (2013.01); *G06N 5/04* (2013.01); *G06N 20/00* (2019.01)

(58) Field of Classification Search
None
See application file for complete search history.

(56) References Cited

U.S. PATENT DOCUMENTS

2003/0154031 A1  8/2003  Potyrailo et al.
2004/0135684 A1  7/2004  Steinthal et al.
(Continued)

FOREIGN PATENT DOCUMENTS

CN  105891041  8/2016
JP  2006-511800  4/2006
(Continued)

OTHER PUBLICATIONS

Küster ("Sequencing of N-Linked Oligosaccharides Directly from Protein Gels: In-Gel Deglycosylation Followed by Matrix-Assisted Laser Desorption/Ionization Mass Spectrometry and Normal-Phase High-Performance Liquid Chromatography", 1997, Analytical Biochemistry, vol. 250, Issue 1, pp. 82-101 (Year: 1997).*
(Continued)

*Primary Examiner* — Roy Y Yi
(74) *Attorney, Agent, or Firm* — Wenderoth, Lind & Ponack, L.L.P.

(57) ABSTRACT

Provided is a novel material analysis technique using a chemical sensor. By reversing the conventional approach, a material to be measured is provided as a receptor of the chemical sensor, and a response signal of the chemical sensor obtained by supplying a known gas or the like to the chemical sensor is obtained. From the response signal, it is possible to identify and distinguish the receptor material, and to obtain its composition and the like. By analyzing the response signal by means of a statistical or machine learning technique such as principal component analysis, linear dis-
(Continued)

criminant analysis, or a support vector machine, the above-mentioned identification and the like can be performed with high accuracy.

13 Claims, 13 Drawing Sheets

(56) References Cited

U.S. PATENT DOCUMENTS

| | | | |
|---|---|---|---|
| 2006/0084877 A1 | 4/2006 | Ujhazy et al. | |
| 2012/0079894 A1* | 4/2012 | Van Berkel | H01J 49/0463 73/863.11 |
| 2013/0133433 A1 | 5/2013 | Yoshikawa et al. | |

FOREIGN PATENT DOCUMENTS

| | | |
|---|---|---|
| JP | 2008-525060 | 7/2008 |
| WO | 2011/148774 | 12/2011 |

OTHER PUBLICATIONS

Randall et al. ("MALDI Imaging of Liquid Extraction Surface Analysis Sampled Tissue", 2016, Analytical Chemistry 2016 88 (17), 8433-8440 (Year: 2016).*

Luts et al. ("A tutorial on support vector machine-based methods for classification problems in chemometrics", Analytica Chimica Acta, vol. 665, Issue 2, 2010, p. 129-145) (Year: 2010).*

Timm et al. ("Peak intensity prediction in MALDI-TOF mass spectrometry: A machine learning study to support quantitative proteomics" (2008) BMC Bioinformatics 9, 443 (2008) (Year: 2008).*

International Search Report (ISR) issued Aug. 20, 2019 in International (PCT) Application No. PCT/JP2019/022080.

Genki Yoshikawa et al., "Two Dimensional Array of Piezoresistive Nanomechanical Membrane-Type Surface Stress Sensor(MSS) with Improved Sensitivity", Sensors, 12, pp. 15873-15887, 2012, cited in the specification.

Vladimir Vapnik, "Estimation of Dependences Based on Empirical Data" [in Russian], Nauka, Moscow, 1979 [English translation], Springer, New York, 1982, cited in the specification.

Thomas Nowotny et al., "Erratum to Optimal feature selection for classifying a large set of chemicals using metal oxide sensors", Sensors and Actuators B 191, pp. 874-878, 2014, cited in the specification. [Sens. Actuators B Chem., 187, 471-480, 2013].

Genki Yoshikawa, "Mechanical analysis and optimization of a microcantilever sensor coated with a solid receptor film", Applied Physics Letters, 98, 173502, 2011, cited in the specification.

Kota Shiba et al., "Data-driven nanomechanical sensing: specific information extraction from a complex system", Scientific Reports, 7, 3661, 2017, cited in the specification.

Kosuke Minami et al., "Pattern recognition of solid materials by multiple probe gases", Materials Horizons, 6, pp. 580-586, 2019.

Office Action issued Dec. 9, 2022 in European Patent Application No. 19819314.6.

Chinese Third Office Action dated Feb. 23, 2023 in corresponding China Patent Application No. 201980039342.5, with English translation.

Extended European Search Report issued Feb. 9, 2022 in European Patent Application No. 19819314.6.

Carey, W. Patrick et al., "Selection of Adsorbates for Chemical Sensor Arrays by Pattern Recognition", Analytical Chemistry, American Chemical Society, 1986, vol. 58, No. 1, pp. 149-153.

Notice of Reasons for Refusal issued Oct. 26, 2021 in corresponding Japanese Patent Application No. 2020-525461, with English translation.

Office Action issued Dec. 23, 2021 in corresponding Chinese Patent Application No. 201980039342.5, with English- language translation.

Office Action issued Aug. 22, 2022 in corresponding Chinese Patent Application No. 201980039342.5, with English translation.

Extended European Search Report issued Jul. 28, 2023 in corresponding European Patent Application No. 19819314.6.

Florian Bender et al., "Identification and Quantification of Aqueous Aromatic Hydrocarbons Using SH-Surface Acoustic Wave Sensors", Analytical Chemistry, (2014), vol. 86, pp. 1794-1799.

Office Action issued Jul. 26, 2023 in Chinese Patent Application No. 201980039342.5, with English-language translation.

* cited by examiner

MATERIAL ANALYSIS METHOD AND MATERIAL ANALYSIS APPARATUS

TECHNICAL FIELD

The present invention relates to material analysis using a chemical sensor.

BACKGROUND ART

Chemical sensors have attracted significant attention as a powerful tool for detecting, distinguishing, and identifying an analyte of interest, especially various odors composed of a complex mixture of gaseous molecules. This type of sensor generally detects a change in a physical parameter caused by adsorption of a molecule to be detected (an analyte molecule). In order to easily detect the change in a physical parameter, the sensor is generally coated with a layer called a "receptor layer" and then used for measurement. Note that in the present application, the sensor before being coated with the receptor may be referred to as a sensor body. The physical parameters detected by this type of sensor are diverse, but non-limiting examples thereof include surface stress, stress, force, surface tension, pressure, mass, elasticity, Young's modulus, Poisson's ratio, resonance frequency, frequency, volume, thickness, viscosity, density, magnetic force, magnetic quantity, magnetic field, magnetic flux, magnetic flux density, electric resistance, electric quantity, dielectric constant, electric power, electric field, charge, current, voltage, potential, mobility, electrostatic energy, capacitance, inductance, reactance, susceptance, admittance, impedance, conductance, plasmon, refractive index, luminous intensity, temperature, and a combination thereof. Specific examples of the chemical sensor include various sensors such as quartz crystal microbalances (QCM), conductive polymers (CP), and field-effect transistors (FET). Such a chemical sensor may be used as a single sensor, but in many cases, has been used as a chemical sensor array configured by collecting a plurality of sensor elements (hereinafter, also referred to as channels) into an array in some form.

In a chemical sensor array, a detected signal is obtained by measuring physicochemical interactions induced by the sorption of an analyte of interest in sensing materials designed to respond to a wide range of chemical classes. Since such a multidimensional dataset obtained by the chemical sensor array contains much information, multivariate analyses using machine learning can be effectively applied to distinguish and identify each specimen. Although a wide range of applications have been demonstrated in various fields, such as food, agriculture, medicine, and environmental science, these pattern recognition based analyses are basically limited to gaseous analytes.

SUMMARY OF INVENTION

Technical Problem

That is, according to the basic principle of various measurements using a conventional chemical sensor, a fluid (mainly a gaseous fluid, but may be a liquid fluid in some cases) analyte is supplied to a chemical sensor having a receptor on a surface thereof, the chemical sensor body converts a change in various physical quantities induced in the receptor by the supply of the analyte into the detected signal, and the above-described measurement of the analyte is thereby performed. An object of the present invention is to distinguish or identify the analyte that can be used as the receptor with a chemical sensor or measure the composition or the like of such an analyte, by applying the above-described operation principle.

Solution to Problem

An aspect of the present invention provides a material analysis method for analyzing a material supported on a chemical sensor, the method including, providing a chemical sensor with a material to be measured supported thereon, and analyzing the material to be measured based on a signal output from the chemical sensor based on a change in a physical parameter induced by the material to be measured by supplying one or more kinds of fluids to the chemical sensor.

The physical parameter may be one or more selected from the group consisting of surface stress, stress, force, surface tension, pressure, mass, elasticity, Young's modulus, Poisson's ratio, resonance frequency, frequency, volume, thickness, viscosity, density, magnetic force, magnetic quantity, magnetic field, magnetic flux, magnetic flux density, electric resistance, electric quantity, dielectric constant, electric power, electric field, charge, current, voltage, potential, mobility, electrostatic energy, capacitance, inductance, reactance, susceptance, admittance, impedance, conductance, plasmon, refractive index, luminous intensity, and temperature.

The analysis may be performed based on a result of extraction of a feature value from the signal output from the chemical sensor.

The fluid and a purging fluid may be alternately supplied to the chemical sensor.

At least one of the one or more kinds of fluids supplied may be a gas.

At least one of the one or more kinds of fluids supplied may be a liquid.

At least one of the gases may be vapor produced from a volatile substance.

The analysis may be to distinguish whether or not the material to be measured is the same as another material.

The analysis may be to identify the material to be measured.

The analysis may be to determine the quantity of a desired component in the material to be measured.

The material to be measured may be analyzed by subjecting the signal output from the chemical sensor to machine learning.

The material to be measured may be analyzed by subjecting the signal output from the chemical sensor to multivariate analysis.

The material to be measured may be analyzed by applying principal component analysis or linear discriminant analysis to the signal output from the chemical sensor.

The material to be measured may be analyzed by applying pattern recognition to the signal output from the chemical sensor.

The pattern recognition may be a support vector machine.

Another aspect of the present invention provides a material analysis apparatus including: a chemical sensor; and an analysis means that analyzes a detected signal output from the chemical sensor so that the material analysis apparatus performs any one of the above material analysis methods.

Advantageous Effects of Invention

As described in detail below, the present invention provides a novel material analysis technique using a receptor as an object to be measured in contrast to prior art in various kinds of measurements using a chemical sensor. As a result, for example, it becomes possible to analyze a material, which has been difficult to use as an object to be measured with a conventional chemical sensor. In addition, by combining this material analysis technique with various data scientific processes such as machine learning, it is possible to analyze an object to be measured with an even higher accuracy.

BRIEF DESCRIPTION OF DRAWINGS

FIG. 10(a) illustrates dot plots of classification accuracy calculated by means of SVM with 5×2 cross validation as a function of numbers of combination of probe gases (n) used for calculation. Histograms on the upper side illustrates the number of combinations, and histograms on the right side illustrates the number of dots for each classification accuracy. FIG. 10(b) illustrates dot plots of classification accuracy with two probe gases. The best and worst cases in accuracy are shown beside the dot plots.

FIG. 12 illustrates PCA score plots obtained by coating each of water dispersions of the three kinds of rice flour on each channel of an MSS and analyzing response signals with respect to two kinds of probe gases by means of PCA. The rice used were rice produced in Hokkaido (variety: Koshihikari) (black solid circle), rice produced in Yamagata Prefecture (Yamagata-ken) (variety: Haenuki) (wash free rice) (open circle), and rice produced in Ibaraki Prefecture (Ibaraki-ken) (variety: Koshihikari) (x mark). The probe gases used were water and ethanol.

DESCRIPTION OF EMBODIMENTS

Figure 1A:
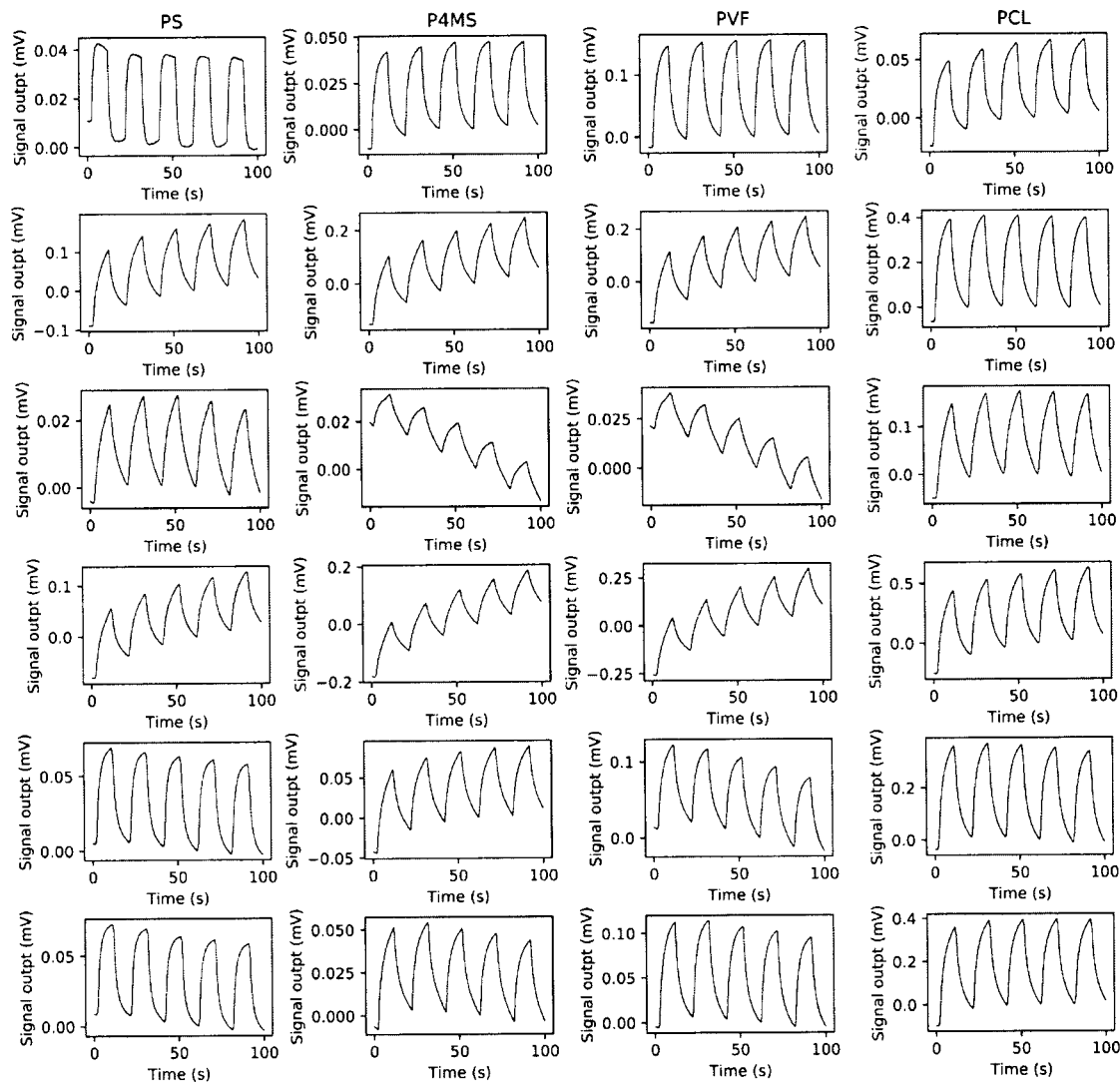
FIG. 1A illustrates response signals of four kinds of polymers (PS, P4MS, PVF, and PCL) with respect to six kinds out of 12 different kinds of vapors (probe gases). The probe gases used were water, ethanol, 1-hexanol, hexanal, n-heptane, and methylcyclohexane in order from the top.

As described above, in measurement with a chemical sensor in prior art, among three elements involved in the measurement, that is, among a chemical sensor body, a receptor, and a fluid such as a gas supplied to the chemical sensor, the fluid is used as an analyte, that is, used as a variable, and distinguishment, identification, and measurement of the composition or the like of the fluid which is a variable are performed based on the detected signal output from the measurement system. However, as a result of studies by the inventor of the present application, it has been found that the roles of these three elements do not have to be fixed as described above, and the variable can be set to something other than a fluid. The present invention has been achieved based on this finding. For example, a known gas (though explanations in the present application are made hereinafter with a gas taken as an example of the fluid to be supplied to a chemical sensor, it is needless to say that a liquid may be used as well) may be supplied to a chemical sensor using an unknown material as a receptor to perform measurements such as distinguishment, identification, and quantification of components of a substance constituting the receptor based on the detected signal output from the chemical sensor by the supply of the gas. Hereinafter, such a gas is referred to as a probe gas.

It should be noted that the following description will be given assuming that using a data scientific technique such as machine learning based on feature values extracted from the detected signal, distinguishment, identification, and determination of the composition or the like of an unknown material are performed by means of various analysis techniques such as pattern recognition. However, the present invention does not require machine learning, pattern recognition, and the like as essential requirements. It should be noted that the principle of the present invention reverses an idea of measurement using a chemical sensor in prior art to determine information regarding an unknown material with which the chemical sensor is coated based on responses to one or more fluids (gases or liquids) supplied to the chemical sensor. For example, when detected signals are very unique, it is possible to distinguish a receptor without performing machine learning. When it is difficult to easily reach a conclusion from the detected signals, or when detailed analysis or the like is required, we can proceed with the analysis by adopting any means such as a machine learning or pattern recognition.

According to one aspect of the present invention, provided is a method opposite to prior art, that is, a method in which a material that can be used as a receptor is pattern recognized by using a chemical sensor. Since the detected signal of a chemical sensor is based on an interaction between a gas and a receptor, an element that performs the detection and an analyte to be detected can be reversed with each other. That is, contrary to prior art, the receptor can be used as an analyte to be detected, while the gas molecule can be used as a probe that performs the detection. As a result, the receptor can be pattern recognized by using the feature value obtained therefrom, or the detected signal (usually the resulting from extraction of the feature value from the signal waveform of the detected signal).

It should be noted that a material that can be used as a receptor is mainly solid but is not particularly limited as long as any other material can be used as a receptor in a chemical sensor used. However, a nonvolatile material is usually preferable. In addition, by making the temperature of the chemical sensor low, even a liquid or a volatile solid can be used as a material to be detected. Though explanations will be given below in which, for the simplicity of description, the material that can be used as a receptor is a solid material, such explanations will not lose generality. In Examples specifically described below, a solution of a solid material is coated using inkjet spotting to be used as a receptor. However, the present invention does not require inkjet spotting as an essential requirement for a method for coating a receptor. Any method that can be used as a method for coating a receptor can be used. In addition, a receptor is prepared as a solution in which a solid material is dissolved in a specific solvent. However, it should also be noted that making a solution is not an essential requirement in the present invention.

In addition to simply distinguishing/identifying a material of interest, quantitative analysis such as determining the composition of a specific component in an analyte can also be performed by appropriately choosing a combination of probe gases used for measurement. In order to perform this, for example, one may simply apply the technique using machine learning previously reported by the inventors of the present application in detail in Non Patent Literature 5 as it is.

In order to describe the above-described principle of the present invention more specifically, a nanomechanical sensor is used as the sensor body of the chemical sensor in the following. The nanomechanical sensor detects mechanical information derived from interactions between a gas molecule and a solid material with high sensitivity. It has been confirmed that almost all solid materials such as an organic compound having low molecular weight, a polymer, and inorganic nanoparticles act on the nanomechanical sensor as a result of gas-solid interactions to give some signals. Therefore, the nanomechanical sensor is an ideal platform for testing various solid materials.

As specifically described below, the same kind of polymers having different molecular weights or polymers composed of different monomers can be successfully distinguished from each other using a pattern recognition technique. In addition, by detailed analysis using a classification model based on a support vector machine (SVM), which is one of pattern recognition techniques, it has been found that solid specimens can be identified with high classification accuracy using only two or three kinds of selected probe gases. Since any gas species, which may be a complex mixture of gaseous molecules, can be used as a probe to increase diversity of the pattern of the detected signal, it is expected that the present invention can increase the resolution of pattern recognition of solid materials based on individual requirements as much as possible.

In addition, as specifically described below, in an exemplary embodiment of the present invention, the solid material used as a receptor is a powdery solid (granular material including nanoparticles, micro-particles, and powders). By using a pattern recognition technique, it is possible to recognize differences between specimens of a single-component granular material including nanoparticles, micro-particles, and powders, or differences between specimens of a granular material including nanoparticles, micro-particles, and powders, in which a plurality of kinds of components are mixed. In the present embodiment, it is not necessary, for example, to separate a plurality of kinds of components contained in a specimen of a granular material including nanoparticles, micro-particles, and powders into individual components and purify the resulting components before being subjected to measurement using the chemical sensor. Therefore, it is possible to easily evaluate the physical and chemical properties of a specimen of a granular material including nanoparticles, micro-particles, and powders in which components (impurities) and the like other than a solid material of interest (granular material including nanoparticles, micro-particles, and powders) are mixed in a complicated manner. That is, according to the present invention, it is possible to easily recognize not only differences between various granular materials including nanoparticles, micro-particles, and powders, but also differences between any other specimens that can be used as receptors depending on the physical and chemical properties thereof as a unique pattern resulting from gas-solid interactions with a fluid (probe gas) supplied to the chemical sensor, more generally resulting from probe fluid-receptor material interactions.

Note that in the present application, a powdery or granular material is defined as a granular material when a particle size thereof is $10^{-2}$ m to $10^{-4}$ m (several mm to 0.1 mm), a powdery or granular material is defined as powder when a particle size thereof is less than $10^{-4}$ m to $10^{-9}$ m (up to several times of the size of an atom), and both are collectively referred to as a granular material including nanoparticles, micro-particles, and powders.

Examples

Hereinafter, the present invention will be described in more detail with reference to Examples. Note that in the following, Membrane-type Surface stress Sensors (MSS) are used as the nanomechanical sensor. The specific structure, manufacturing method, operation, properties, and the like of the MSS are well-known and are not specifically described in the present application, but refer to Patent Literature 1, Non Patent Literature 1, and the like as necessary.

In the following, four different kinds of polymers, polystyrene (PS), poly(4-methylstyrene) (P4MS), polycaprolactone (PCL), and polyvinylidene fluoride (PVF) were identified through pattern recognition performed using the detected signal obtained using the MSS. PS and P4MS were selected as a pair of polymers having similar chemical structures, and PCL and PVF were selected as a pair of polymers having similar chemical properties, specifically, hydrophobicity. The chemical structural formulas of these four kinds of polymers are illustrated below.

[Chemical Formula 1]

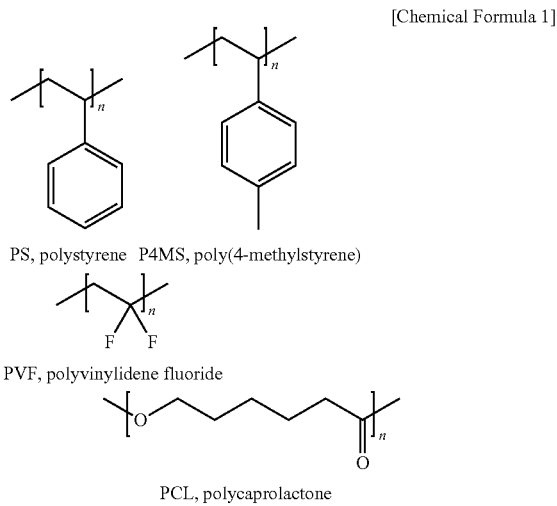

PS, polystyrene    P4MS, poly(4-methylstyrene)

PVF, polyvinylidene fluoride

PCL, polycaprolactone

PS (average molecular weight Mw=35000, hereinafter referred to as PS (35 k)), PS (Mw=280000, hereinafter referred to as PS (280 k)), PS (Mw=350000, hereinafter referred to as PS (350 k)), PCL, P4MS, and PVF were purchased from Sigma-Aldrich. DMF (N,N'-dimethylformamide) as a solvent to prepare polymer solutions for inkjet spotting was purchased from Fujifilm Wako Pure Chemical Industries, Ltd.

Ethanol, 1-hexanol, hexanal, n-heptane, methylcyclohexane, toluene, ethyl acetate, acetone, chloroform, aniline, and propionic acid (analytical or higher grade) used as probe gases were purchased from Sigma-Aldrich, Tokyo Chemical Industry Co., Ltd., and Fujifilm Wako Pure Chemical Industries, Ltd. All chemicals were used as purchased. As the probe gases, 12 kinds of gases consisting of the 11 kinds of chemical substances listed above and water vapor (also referred to as water in the figure) were used. Ultrapure water was used in order to obtain water vapor. Note that these 12 kinds of probe gases exist as liquids at room temperature, and therefore may be referred to as solvents in a liquid state. In addition, vaporized substances of these liquids may be referred to as vapor or solvent vapor.

Each polymer was dissolved in DMF at a concentration of 1 mg/mL, and the resulting solutions were deposited on each channel of the MSS by inkjet spotting. That is, each channel of the MSS was coated with each polymer by inkjet spotting. An inkjet spotter (LaboJet-500SP from MICROJET Corporation) equipped with a nozzle (IJHBS-300 from MICROJET Corporation) was used. The injection speed, volume of a droplet, and number of inkjet shots were fixed at about 5 m/sec, about 300 pL, and 300 shots, respectively. A stage of the inkjet spotter was heated at 80° C. to dry DMF. Each polymer was coated at least two different channels on the MSS to investigate the coating quality. The specific number of coated channels (N) was as follows: PS(35 k): N=3; PS(280 k): N=2; PS(350 k): N=11; PCL: N=11; P4MS: N=11; PVF: N=11.

Using vapor of each of the above 12 kinds of substances as a probe gas, a detected signal indicating a gas-solid interaction was obtained for each combination of 12 kinds of probe gases with four kinds of polymers from the MSS (more specifically, four MSS sensor channels arranged on the MSS chip). Specifically, the following apparatus configuration and procedure were used.

The polymer-coated MSS chips prepared as described above were mounted in a Teflon (registered trademark) chamber (MSS chamber), which was placed in an incubator (Incubator-1) with controlled temperature of 25.0±0.5° C. The chamber was connected to a gas system consisting of: two mass flow controllers (MFC-1 and MFC-2); a purging gas line; a mixing chamber and a vial for a solvent liquid in an incubator (Incubator-2) with a controlled temperature of 15.0±0.5° C. The vapor of each solvent was produced by bubbling of a carrier gas. Pure nitrogen gas was used as a carrier gas and a purge gas. The total flow rate was kept at 100 mL/min during the experiments. The concentrations of the 12 different kinds of solvent vapors were controlled using MFC-1 at $P_a/P_o=0.1$, where $P_a$ and $P_o$ stand for the solvent's partial vapor pressure and saturated vapor pressure, respectively.

Figure 1B:
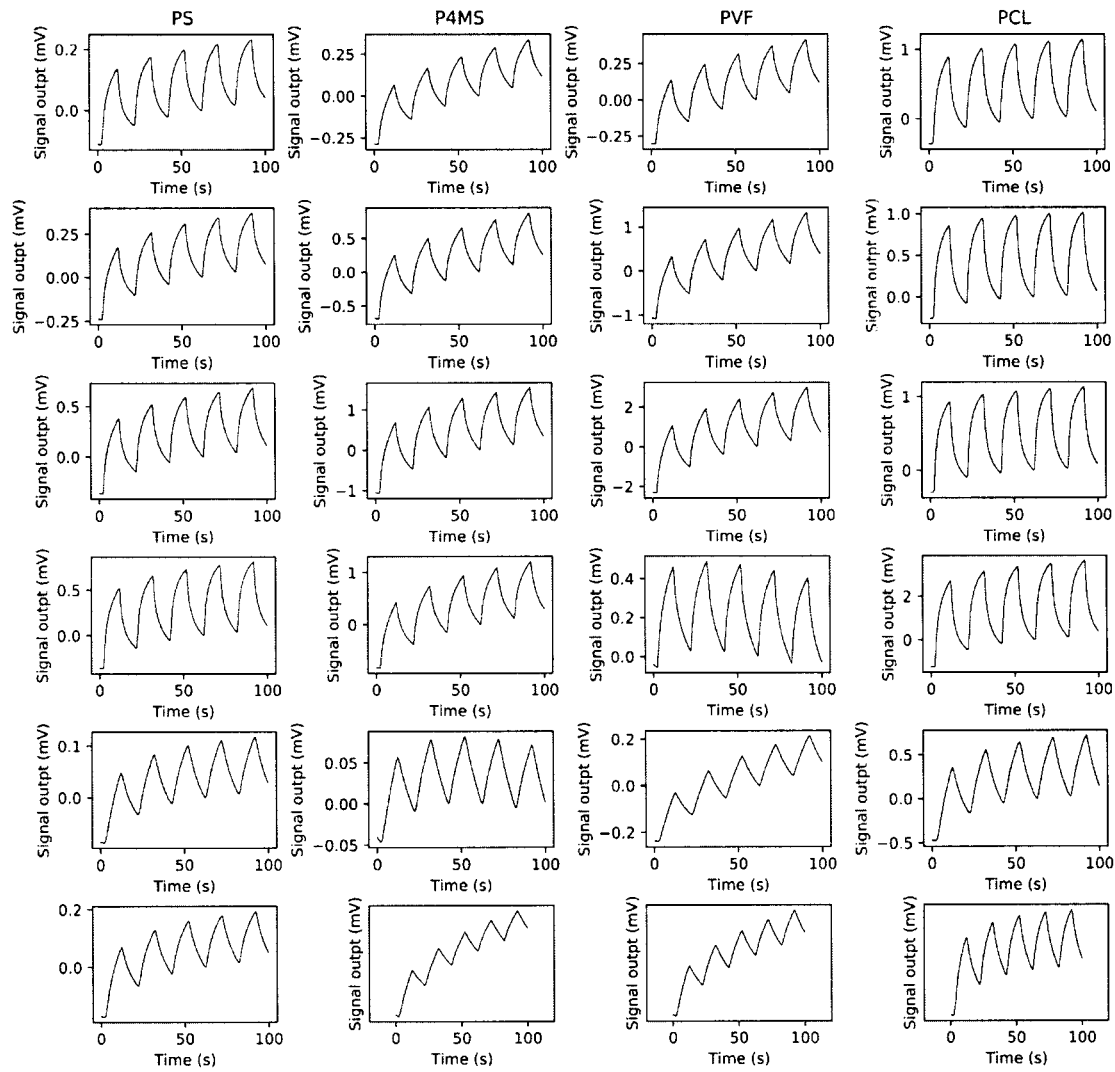
FIG. 1B illustrates response signals of four kinds of polymers (PS, P4MS, PVF, and PCL) with respect to the remaining six different kinds of vapors (probe gases). The probe gases used were toluene, ethyl acetate, acetone, chloroform, aniline, and propionic acid in order from the top.

Before measuring MSS signals, pure nitrogen gas was introduced into the MSS chamber for one minute. Subsequently, MFC-1 (probe gas line) was switched on/off every 10 seconds with a controlled total flow rate of 100 mL/min using MFC-2. This on/off switching was repeated for five cycles. FIGS. 1A and 1B illustrate examples of signals from the MSS sensor channels coated with four kinds of polymers, PS, P4MS, PVF, and PCL with respect to the same probe gas. These figures illustrate specific examples of signals corresponding to respective combinations of the MSS sensor channels coated with the above four kinds of polymers and 12 kinds of probe gases. The data were measured with a bridge voltage of the MSS sensor channels of −0.5 V and recorded with a sampling rate of 10 Hz.

As described above, when each polymer was exposed to each vapor, as can be seen from FIGS. 1A and 1B, a response signal from each polymer (signal output from the MSS sensor channel) was unique in terms of intensity and shape, reflecting chemical and physical affinity between the polymer and the vapor.

Figure 2:
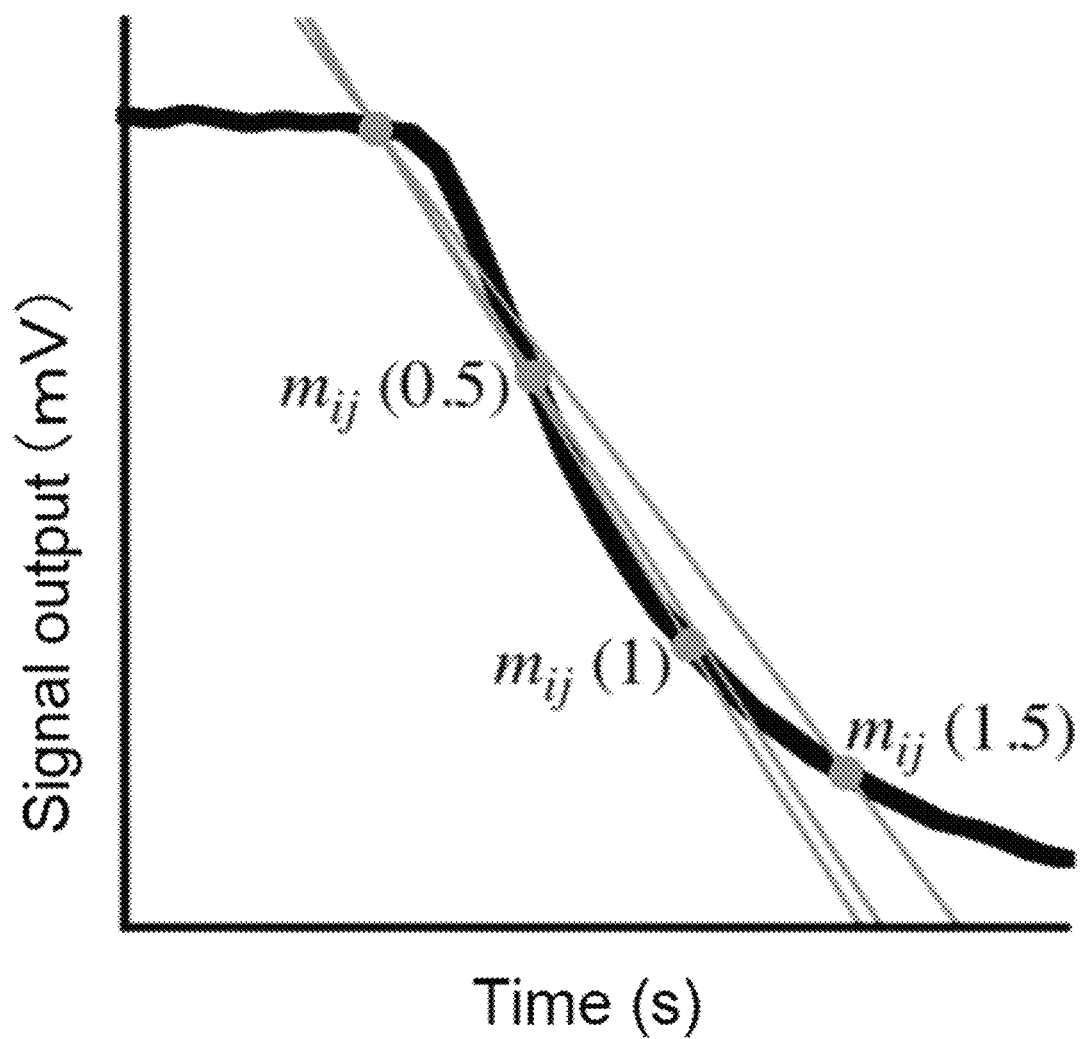
FIG. 2 is a diagram illustrating a method for extracting a feature value from each normalized response signal.

Analysis using supervised learning (supervised analysis) and analysis using unsupervised learning (unsupervised analysis) were performed for the datasets thus obtained (that is, sets of data obtained by digitizing the waveform of each response signal). Specifically, linear discriminant analysis (LDA) and principal component analysis (PCA) were utilized for supervised learning and unsupervised learning, respectively. As illustrated in FIG. 2, a plurality of parameters was extracted as a set of the feature values from each decay curve of each normalized response signals. As illustrated in the upper left diagram, the upper right diagram, and the lower left diagram in FIG. 3, the four different polymers could be clearly distinguished by means of PCA using all the feature values from the 12 kinds of probe gases. Refer to FIG. 4 for a PC1-2 plane using the feature values derived from one kind of probe gas. In FIG. 4, on the PC1-2 plane, PS and P4MS form clusters close to each other, reflecting their chemical and physical similarities to each probe gas. Note that the same applies to FIG. 3. In fact, because of the similar chemical structure and physical properties of PS and P4MS, the clusters are close in PCA and LDA. In a case of LDA illustrated in the lower right diagram in FIG. 3, the polymers were clearly classified without corresponding clusters thereof overlapping each other. This indicates feasibility of distinguishing solid materials by means of pattern recognition based on the present invention.

Figure 3:
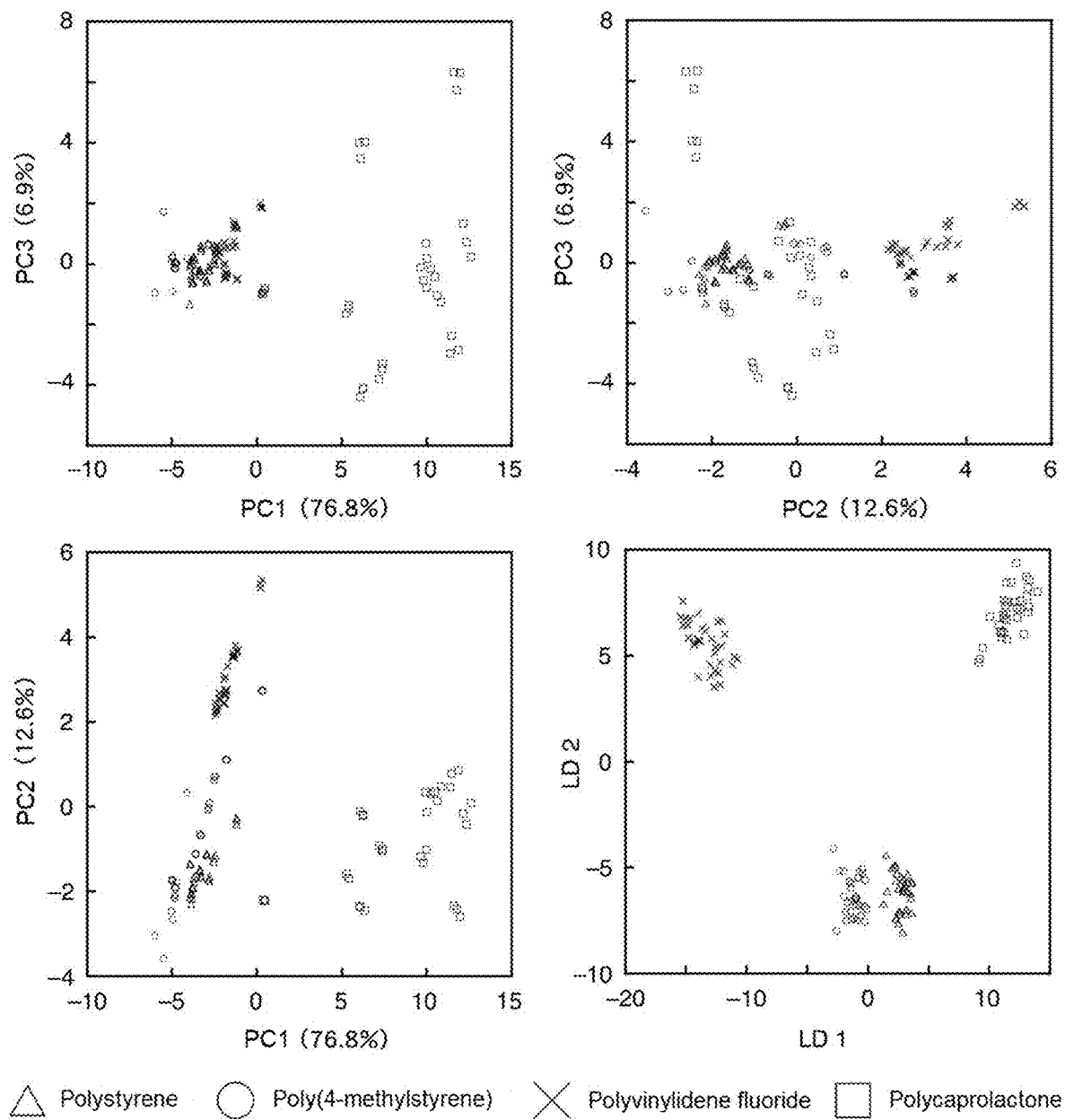
FIG. 3 illustrates identification of four kinds of polymers. The upper left diagram, the upper right diagram, and the lower left diagram each illustrate PCA score plots obtained by coating an MSS with each of the four kinds of polymers and analyzing response signals with respect to the 12 different kinds of vapors (probe gases) by means of PCA. The lower right diagram illustrates LDA score plots obtained by analyzing the same response signals by means of LDA. The polymers used were PS(350 k), P4MS, PVF, and PCL, and the number of MSS channels coated with each polymer was N=11.
Figure 4:
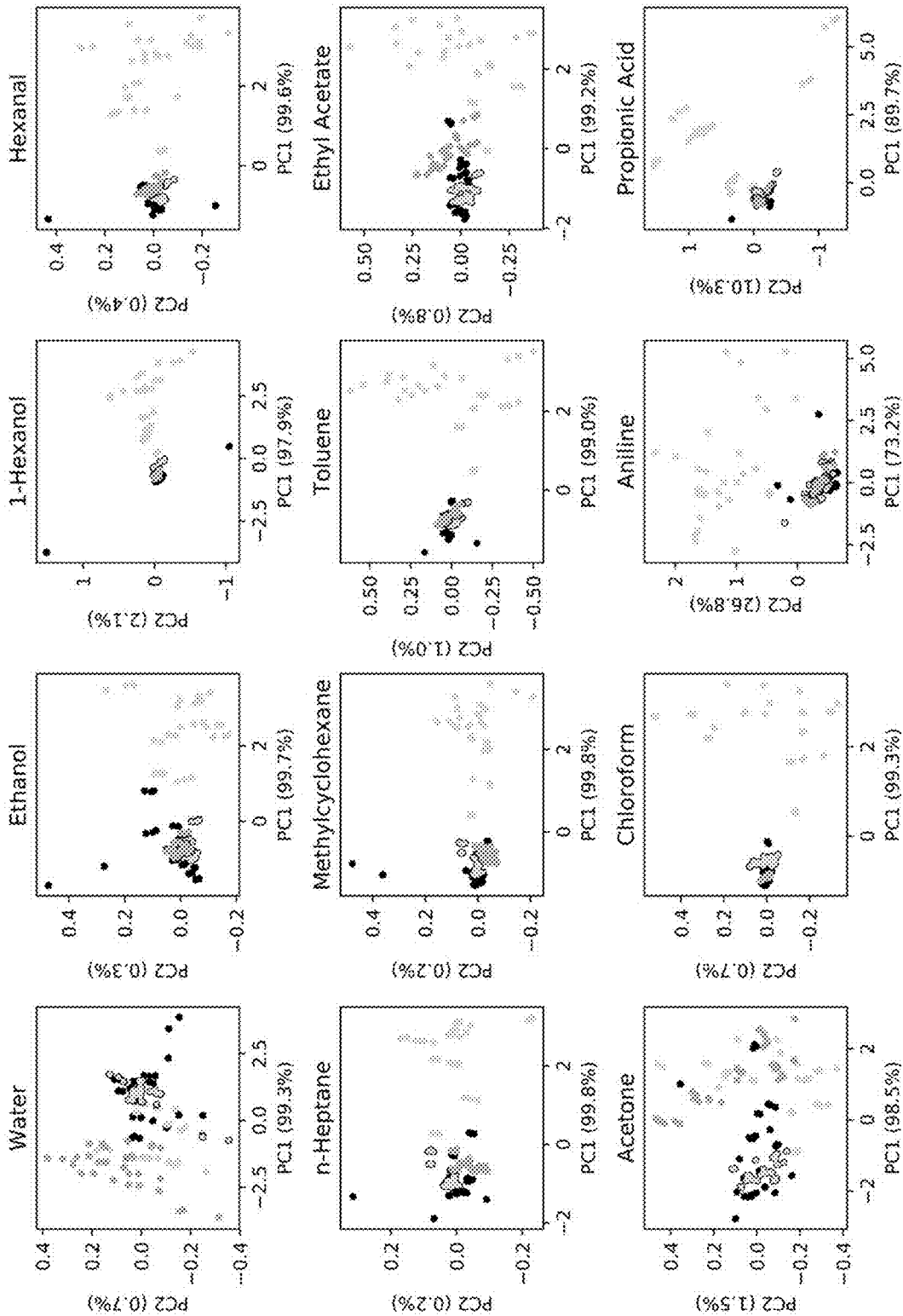
FIG. 4 illustrates PCA score plots of feature values obtained from response signals from each one kind of solvent for distinguishing four different kinds of polymer materials (PS(350 k), P4MS, PVF, and PCL). N=11 was used. In the PCA score plots, an outlined gray circle represents PS, a black circle represents P4MS, a slightly dark gray circle represents PVF, and a slightly light gray circle represents PCL.

It should be noted that several sub-clusters are also found in each cluster of PCA illustrated in the upper left diagram, the upper right diagram, and the lower left diagram in FIG. 3. Since each of these small sub-clusters corresponds to each polymer layer coated onto each channel of the MSS (11 channels for each polymer species), it can be considered that the differences between these sub-clusters are regarded as the coating reproducibility of each polymer layer. Therefore, the method of the present invention provides enough resolution to recognize such minute differences in the quality of coatings as well as the differences in coating materials.

PCA and LDA were adopted using scikit-learn, which is a machine learning library for Python. In PCA, data is projected onto lower dimensions so that variance of a first principal component (Principal component 1; PC1) becomes the largest. Successive principal components after the first principal component are determined to maximize under a constraint that an (n+1)-th principal component is orthogonal to an n-th principal component.

In contrast to PCA, in LDA, data is projected onto a lower dimension to maximize cluster separation. LDA maximizes a distance between classes and minimizes variance in the same class.

The present application also provides machine learning models based on an SVM classifier with a nonlinear kernel (Non Patent Literature 2). The 36 sets of feature values (three parameters from each probe gas) of 132 samples (33 samples from each polymer) were used in building an optimal SVM model and its validation. Eighty percent out of all the samples (105-106 samples) were used for the training datasets. After tuning the hyperparameters of a radial basis function (C and γ), the remaining 26-27 parameters were used for validation of the SVM model. To calculate identification accuracy five-fold cross validation was adopted. All combinations of each probe gas were calculated to create SVM models. The number of trained SVM models was 4095 ($=2^{12}-1$).

To further describe SVM here, PCA and LDA are utilized for reducing the dimensionality of datasets. By projecting the data onto a lower-dimensional space, one can visually recognize the coated materials according to cluster separation. In order to identify each coated material and to evaluate its accuracy, classification models based on SVM with a radial basis function kernel were developed. A set of feature values were extracted from each decay curve of the normalized MSS signals measured with the 12 different kinds of gases as illustrated in FIG. 2. Three different slopes $m_{ij}(t_n)$ were extracted from the i-th channel with the j-th gas according to the following equation: $m_{ij}(t_n)=[l_{ij}(t_0)-l_{ij}(t_0't_n)]/t_n$, where $l_{ij}(t)$ represents a signal output at time t, and $t_0$ represents time at which a response signal starts to decay. In the present application, three time points, that is, $t_n$=0.5, 1, and 1.5 (seconds) were selected as $t_n$. Three sets of parameters $[m_{ij}(0.5), m_{ij}(1), m_{ij}(1.5)]$ were extracted from three cycles between 40 seconds and 100 seconds in a signal response out of five cycles in each measurement. A reason for making such a selection is that during a series of measurements, a signal response in a later cycle in time provides more reproducible signals than that of the beginning. This indicates that there are initial fluctuations associated with mixing of sample gases and pre-adsorbed gases. Needless to say, it should be noted that the method for extracting a feature value is not limited to the method described above with reference to FIG. 2.

Classification models based on a non-linear SVM were developed using scikit-learn libraries for Python. In order to optimize and evaluate the models, 5×2 cross validation was employed. The whole database was first split into five datasets. Out of the datasets, four datasets were used as training datasets, and the remaining one dataset was used as a test dataset. The training datasets were further split into two sub-datasets. Based on these sub-datasets, hyperparameters of SVM (that is, C and γ) were optimized. This validation process was repeated for all the combinations of the five datasets for evaluating the classification accuracy of the models.

Figure 5:
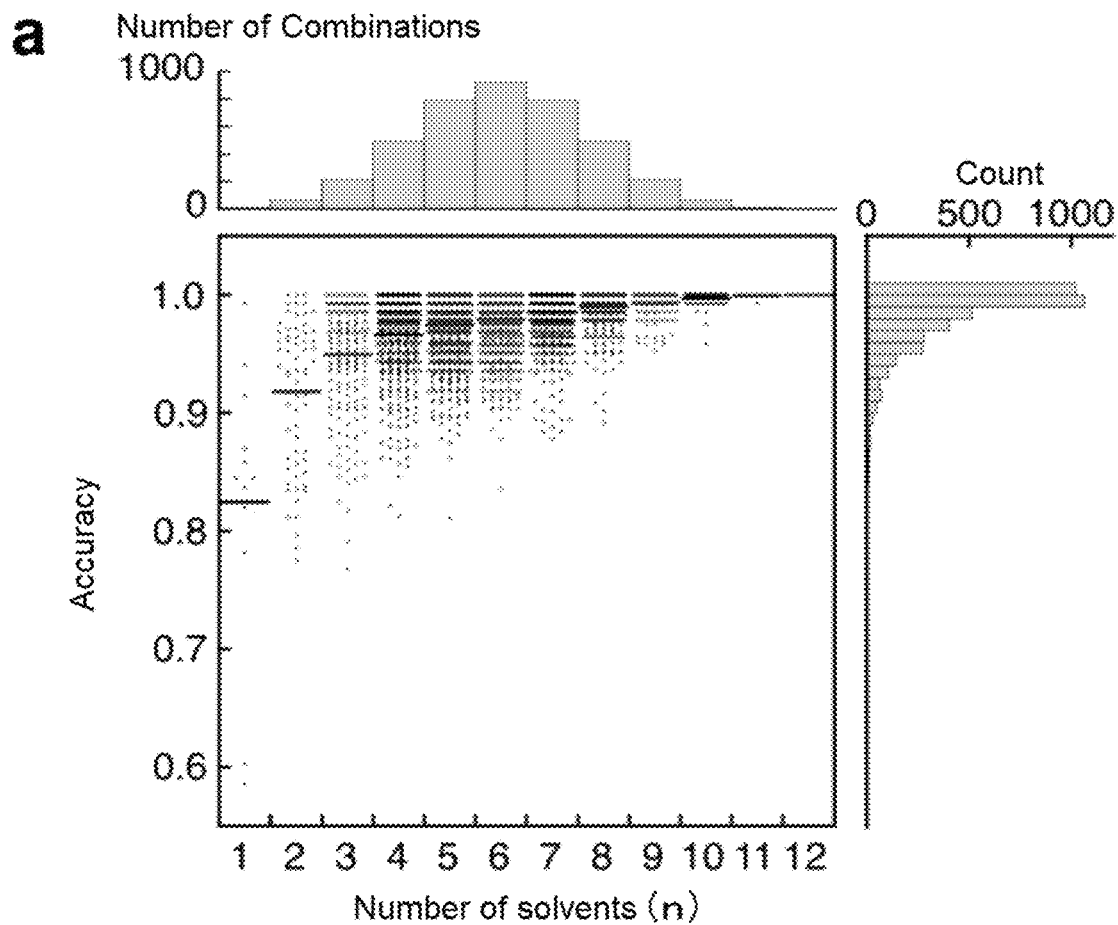
FIG. 5(a) illustrates dot plots of classification accuracy calculated by means of a support vector machine (SVM) with 5×2 cross validation as a function of numbers of combination of probe gases (n) used for calculation. Histograms on the upper side illustrates the number of combinations, and histograms on the lower side illustrates classification accuracy.
FIG. 5(b) illustrates dot plots of classification accuracy with the combinations of two probe gases selected from the 12 different kinds of probe gases, the same as above. The best and worst cases in accuracy are shown beside the dot plots.
Figure 5:
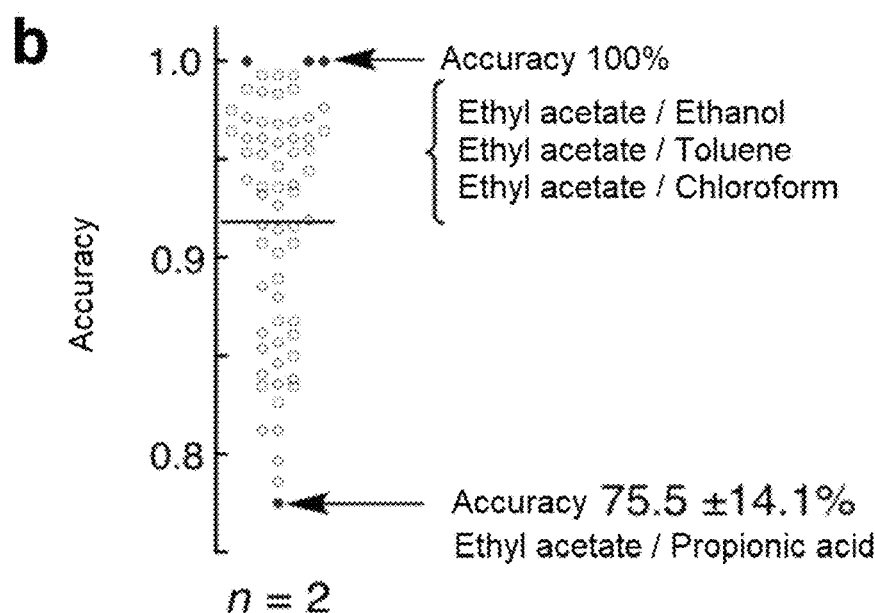
Figure 6:
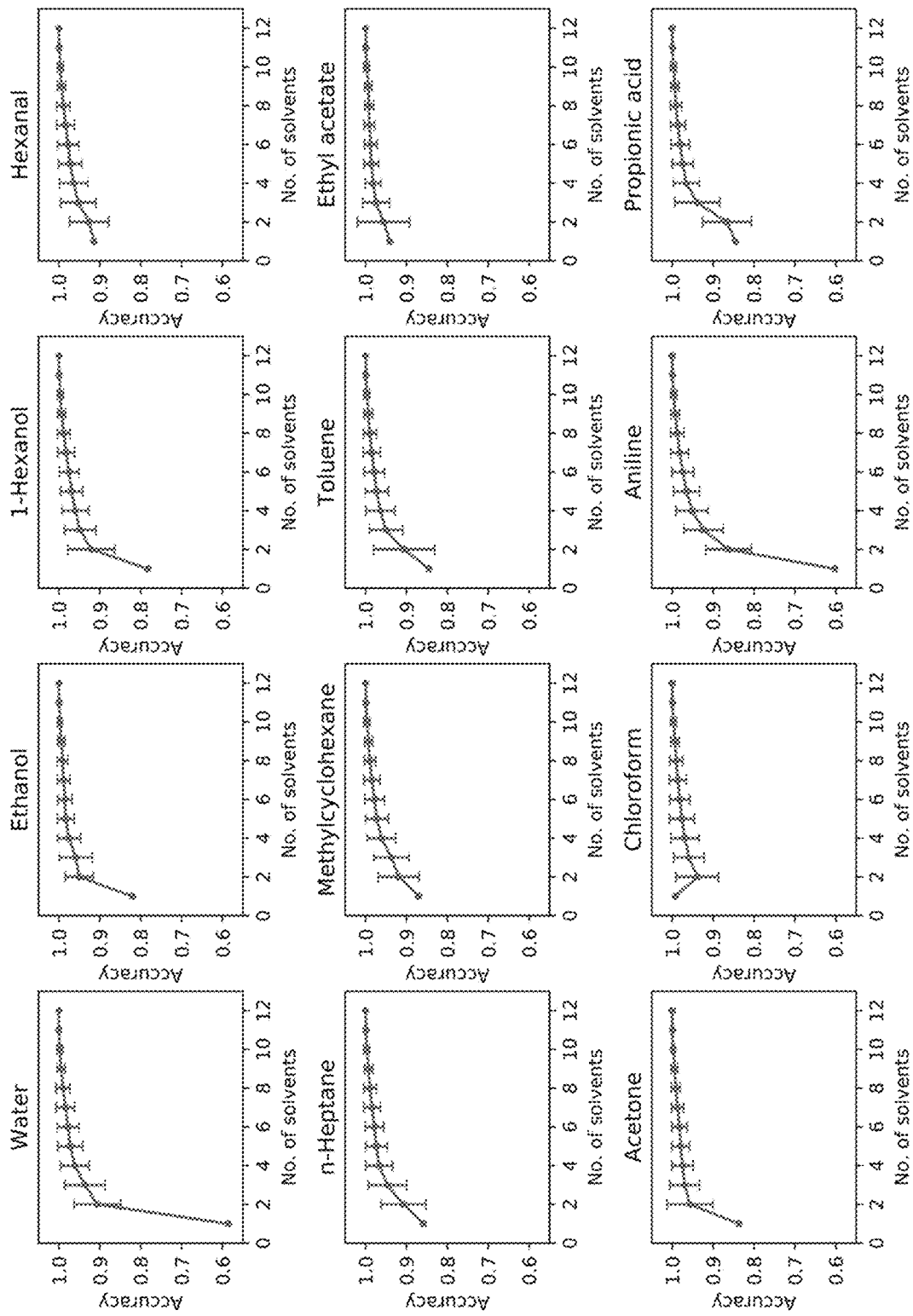
FIG. 6 illustrates the classification accuracy of polymer materials when a combination of selected solvents including a solvent described in the upper part of each graph is used as a function of numbers of solvents (n) used. An average classification accuracy is shown together with a standard deviation.

Identification accuracies depending on the combination of the probe gases are shown as dot plots in FIG. 5(a), and the calculated results of average accuracy obtained from combinations with selected probe gases are shown in FIG. 6. By means of the SVM analysis, the sets of feature values from the 12 kinds of probe gases could be clearly classified for each polymer with identification accuracy of 100%. Remarkably, almost ¼ of the combinations of probe gases resulted in identification accuracy of 100% using 2 to 12 kinds of probe gases. The usage rates of the probe gases are summarized in the table below (Table 1). This table illustrates summary of the SVM classification. The sub-columns of "Polymer" and "Mol. weight" (Molecular weight) in the column of "Usage rate" indicate the usage rate of a probe gas described in the leftmost column (Probe gas) in a combination of probe gases achieving accuracy (polymer identification accuracy) of 100% for distinguishing different polymers, and the usage rate of a probe gas described in the leftmost column (Probe gas) in a combination of probe gases achieving accuracy (molecular weight identification accuracy) of 100% for distinguishing polymers having different molecular weights, respectively. The sub-columns of "Polymer" and "Mol. weight" (Molecular weight) in the column of "Accuracy" each indicate identification accuracy when one set of feature values from each probe gas is used similarly to the above. Each identification accuracy is shown as a "mean value±standard deviation" of accuracy obtained in cross validation.

TABLE 1

| Probe gas | Usage rate | | Accuracy | |
|---|---|---|---|---|
| | Polymer | Mol. weight | Polymer | Mol. weight |
| Water | 82.1% | 53.5% | 58.6 ± 6.3% | 65.4 ± 15.7% |
| Ethanol | 59.1% | 51.0% | 82.0 ± 7.7% | 78.4 ± 16.9% |
| 1-Hexanol | 34.6% | 51.9% | 78.2 ± 8.8% | 82.0 ± 10.8% |
| Hexanal | 56.1% | 62.2% | 91.4 ± 9.7% | 86.8 ± 12.0% |
| n-Heptane | 51.6% | 67.9% | 85.8 ± 8.3% | 89.1 ± 8.7% |
| Methyl cyclohexane | 46.2% | 63.1% | 87.0 ± 3.2% | 78.3 ± 3.7% |
| Toluene | 58.5% | 27.2% | 84.5 ± 8.0% | 91.5 ± 3.9% |
| Ethyl acetate | 70.9% | 78.5% | 94.0 ± 3.8% | 80.7 ± 15.8% |
| Acetone | 52.8% | 97.4% | 83.7 ± 11.8% | 88.3 ± 6.6% |
| Chloroform | 65.6% | 14.7% | 99.3 ± 1.4% | 71.1 ± 13.8% |
| Aniline | 46.2% | 49.7% | 60.2 ± 8.8% | 77.9 ± 6.5% |
| Propionic acid | 60.4% | 53.8% | 84.5 ± 15.7% | 78.8 ± 10.5% |
| Number of 100% combinations | 1021 | 312 | | |
| Total number of combinations | $4095 = (2^{12} - 1)$ | | | |

These results clearly indicate that the appropriate selection of probe gases depending on the solid samples of interest leads to highly accurate and efficient identification. Refer also to FIG. 5(b) for this. For example, in this case, by using two probe gases (that is, a combination of ethyl acetate and ethanol, a combination of ethyl acetate and toluene, and a combination of ethyl acetate and chloroform), identification accuracy of 100% is achieved, while another combination (ethyl acetate and propionic acid) results in the lowest accuracy of 75.5±14.1%.

Figure 7:
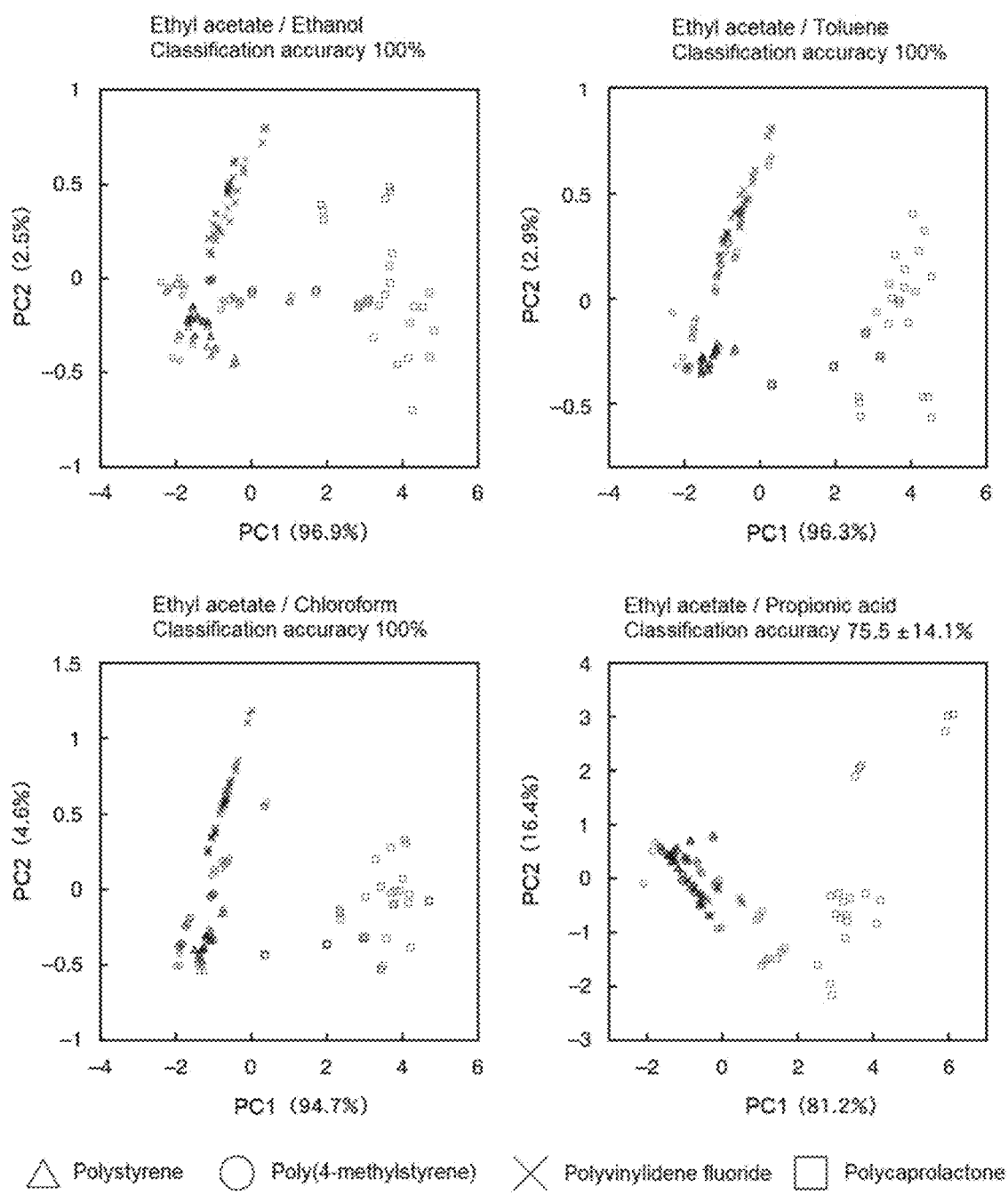
FIG. 7 illustrates PCA plots for each combination, which result in the best or worst result of classification accuracy calculated by means of SVM, out of combinations each consisting of two kinds of probe gases selected from 12 different kinds of probe gases. A combination of ethyl acetate and ethanol, a combination of ethyl acetate and toluene, and a combination of ethyl acetate and chloroform resulted in the best results for the classification accuracy calculated by means of SVM, and a combination of ethyl acetate and propionic acid resulted in the worst result.

Based on the above results, using the best and worst combinations of the two probe gases, PCA was performed again for visual recognition. As expected, in the case of the best combinations, as illustrated in the upper left diagram, the upper right diagram, and the lower left diagram in FIG. 7, most of the clusters were well-separated, while in the case of the worst combination, as can be seen from the lower right diagram in FIG. 7, a dense overlap of the clusters appeared, especially between PS and P4MS. It is considered that this high pattern recognition accuracy was achieved by a combination of probe gases distinguishing PCL which is a polar substance from other substances and probe gases distinguishing PS, P4MS, and PVF from each other. Refer also to the above table and FIG. 4 for this. It should be noted that clear separation of clusters in PCA does not necessarily lead to high classification accuracy in SVM (Non Patent Literature 3).

Figure 8:
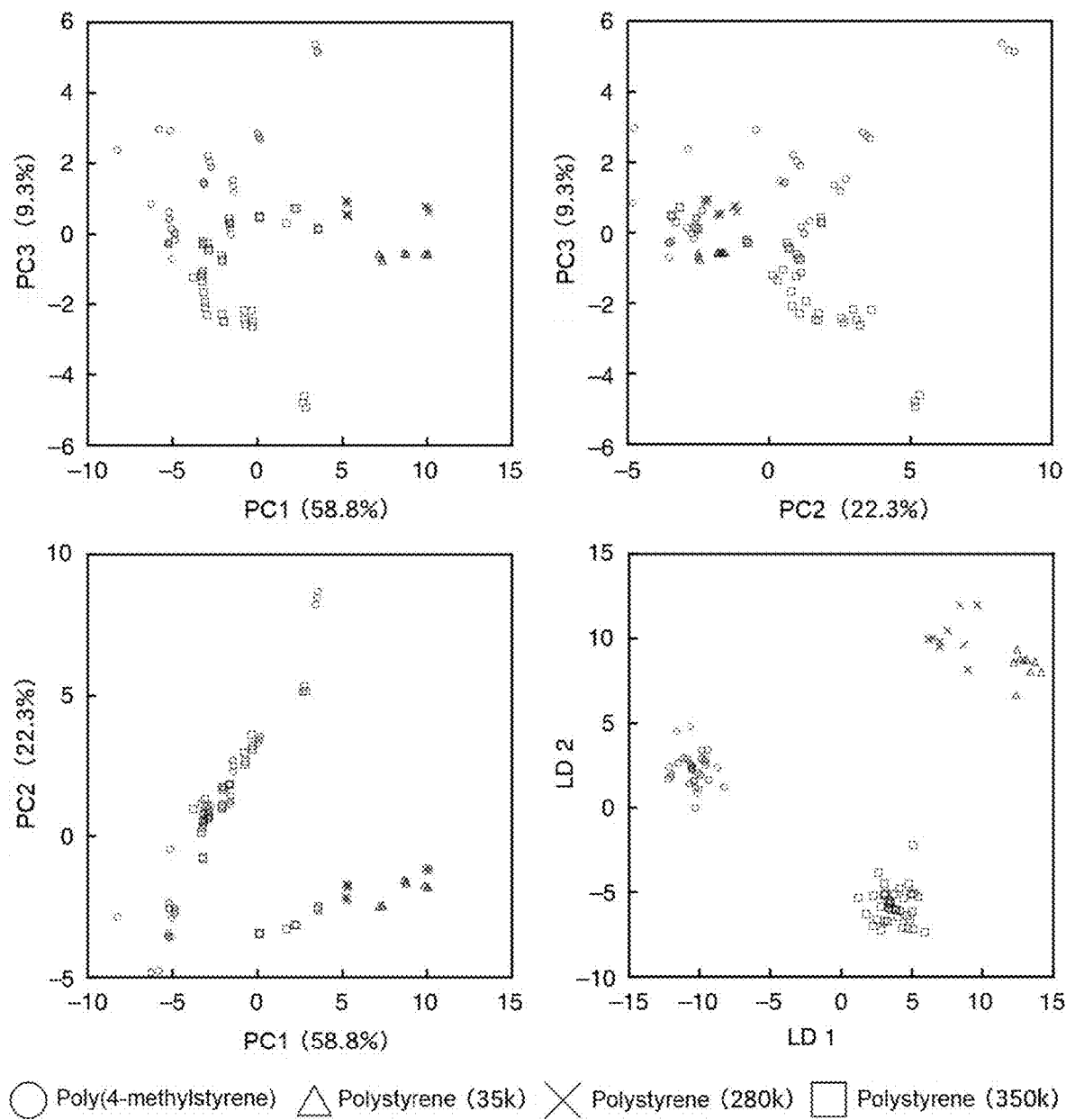
FIG. 8 illustrates PCA score plots (upper left, upper right, and lower left) and LDA score plots (lower right) illustrating results of identification of molecular weights of polymers based on the present invention. An MSS was coated with each of four kinds of polymers, and measurement was performed with 12 different kinds of probe gases. The polymers used were polystyrene having an average molecular weight Mw=350000 (PS(350 k)), poly(4-methylstyrene) (P4MS) having Mw=72000, polystyrene having Mw=280000 (PS(280 k)), and polystyrene having M=35000 (PS (35 k)).
Figure 9:
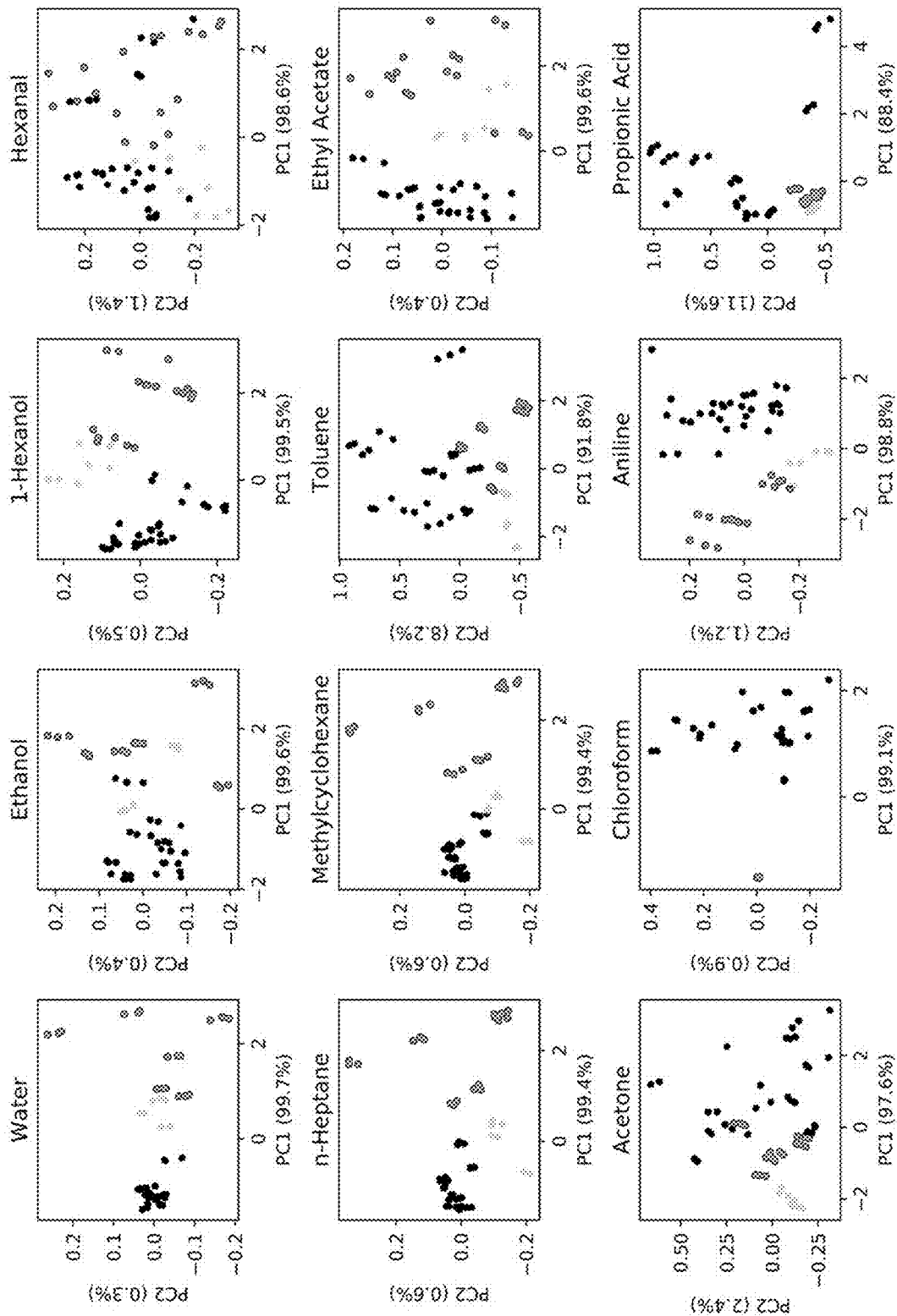
FIG. 9 illustrates PCA score plots of feature values obtained from response signals from each one kind of solvent for distinguishing three different kinds of polymer materials (PS(350 k), P4MS, and PS (280 k)). In the PCA score plots, a gray circle represents PS (350 k), a black circle represents P4MS, and an outlined gray circle represents PS (280 k).

In order to evaluate further applicability of pattern recognition of solid materials, experimental results of molecular weight identification of polymers are described. Two different kinds of polymers having different molecular weights (PS(35 k) and PS(280 k)) were added, each channel of the MSS was coated with each of these polymers in a similar manner to the other polymers, and their responses with respect to the above-described 12 kinds of probe gases were measured. Sets of feature values were extracted from these responses in a similar manner to the other polymers, and combined with previously measured datasets for PS(350 k) and P4MS. Analysis was performed on these datasets for the 12 kinds of probe gases by means of PCA and LDA. As illustrated in FIG. 8, the PCA score plots (upper left diagram, upper right diagram, and lower left diagram in FIG. 8) resulted in some misclassification, especially between PS and P4MS. However, in the LDA (lower right diagram in FIG. 8), polystyrenes including PS and P4MS could be clearly distinguished from each other in terms of molecular weight. Refer to FIG. 9 for a PC1-2 plane using the feature values from one kind of probe gas. According to Non Patent Literature 4 previously disclosed by the inventor of the present application, a response of a nanomechanical sensor is strongly affected by the physical properties of a receptor layer, such as Young's modulus. It has been reported that polystyrene thin films used in Examples of the present application have Young's moduli in the range from 3.4 to 3.9 GPa. Thus, it is understood that the pattern recognition technique, which is one aspect of the present invention, can distinguish among materials of Young's moduli within such a narrow range.

Figure 10:
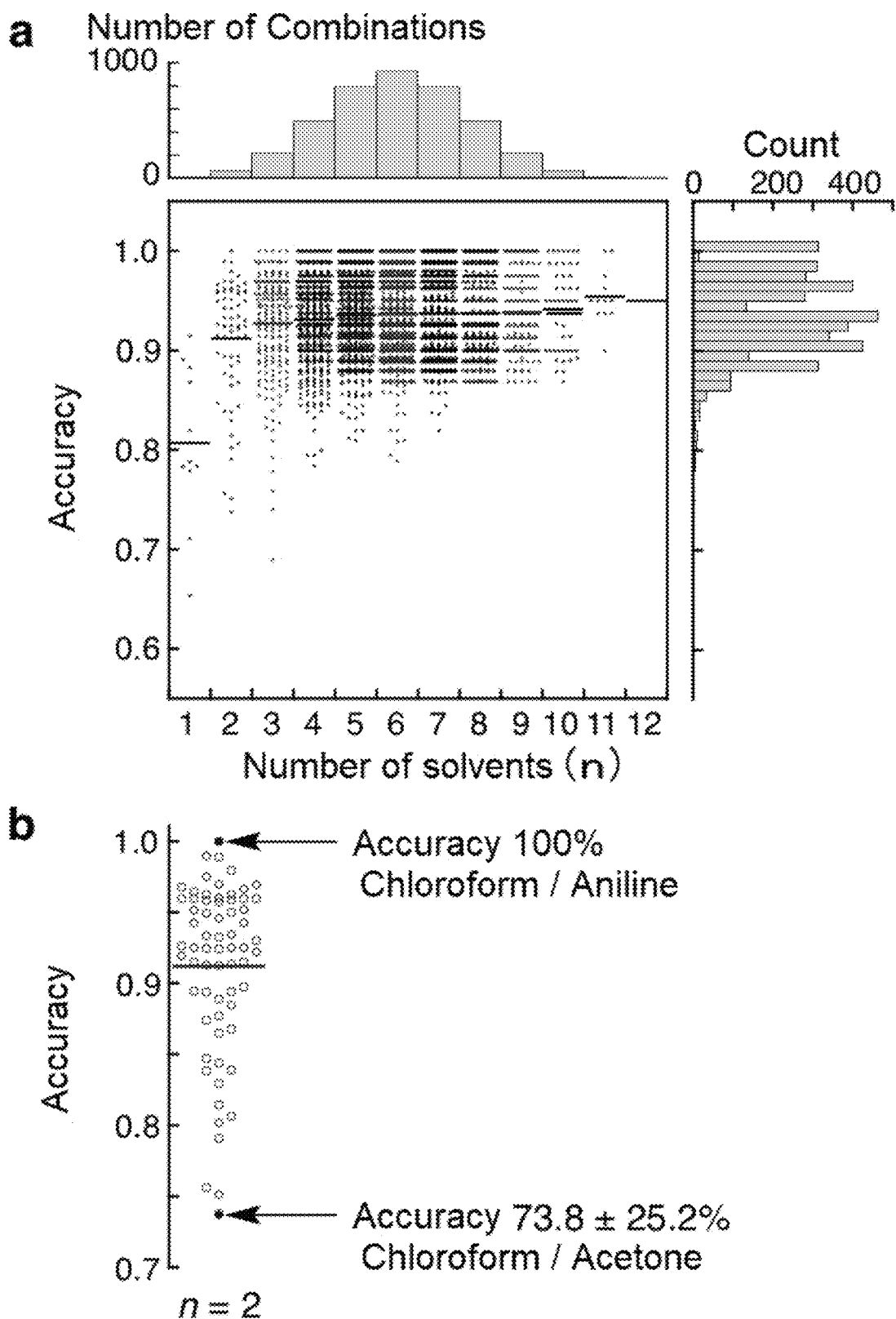
FIG. 10 illustrates SVM classification results for identifying the molecular weight of a polymer.
Figure 11:
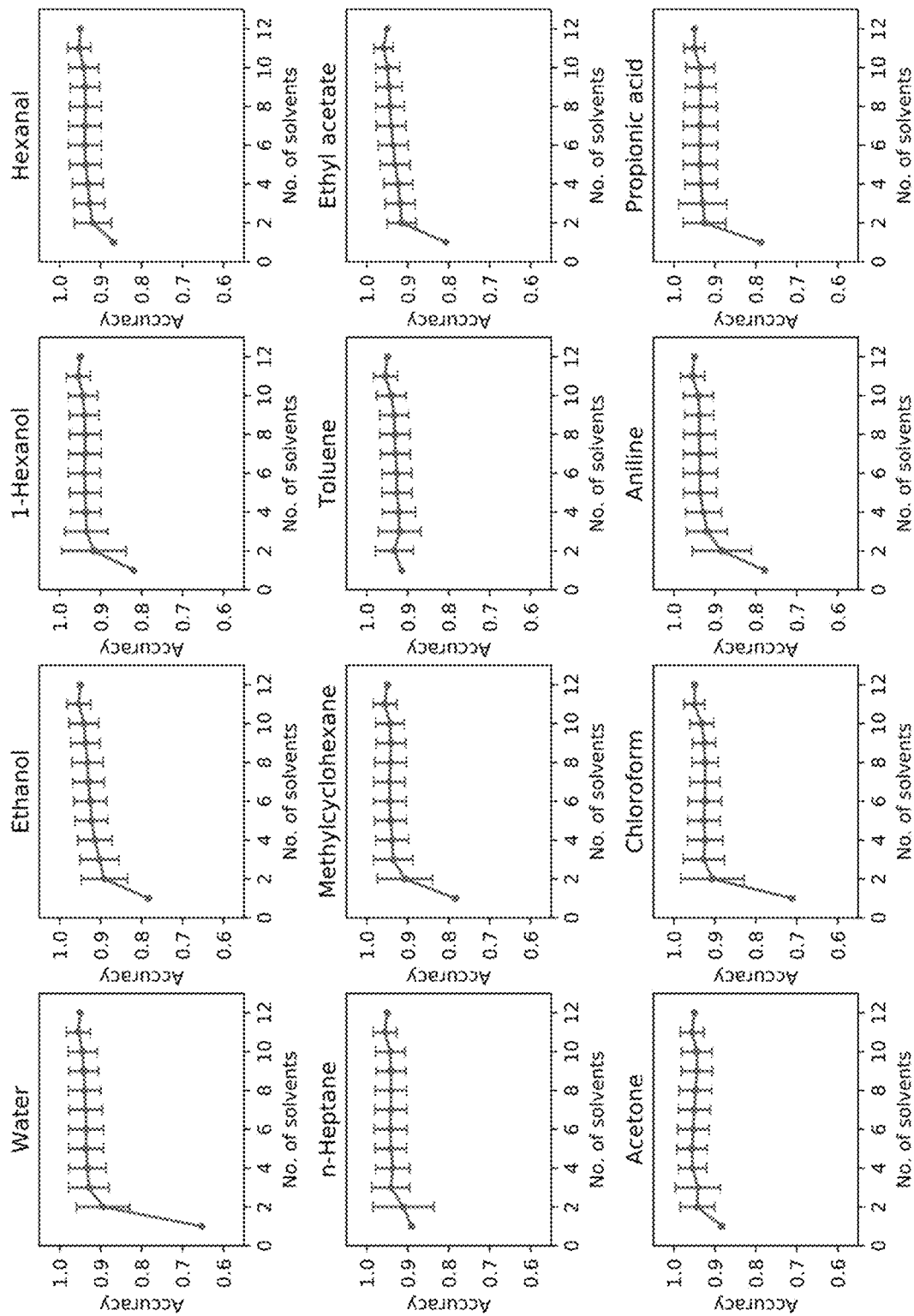
FIG. 11 illustrates the classification accuracy of the molecular weights of polymer materials when a combination of selected solvents including a selected solvent is used as a function of numbers of solvents (n) used. An average classification accuracy is shown together with a standard deviation.

SVM classification can also be performed for a combination of responses with respect to the 12 kinds of probe gases. As illustrated in FIG. 10(a) and the above table, in 312 combinations out of all combinations of the probe gases (7.6% of all combinations), differences in molecular weight could be identified with accuracy of 100%, while, in the largest set of feature values extracted from response signals due to all 12 kinds of probe gases, accuracy was 95.0±0.10%. Refer also to FIG. 11 for this. As illustrated in FIG. 10(b), it should be noted that accuracy of 100% was achieved by using a specific combination of two kinds of probe gases, specifically by using a combination of chloroform and aniline. Furthermore, as can be seen from the above table, even when only one probe gas is used, specifically, identification accuracy of 91.5±3.9% is achieved by using toluene. As illustrated in FIG. 9, the differences in molecular weights can be roughly distinguished based on a PCA score plots of almost any probe gas.

From the above results, by choosing a couple of appropriate probe gases, the pattern recognition according to one aspect of the present invention can also be effectively applied to a plurality of solid materials to identify each analyte even with similar chemical and physical properties. As the inventors of the present application have previously reported in Non Patent Literature 5, these properties can be correlated with other material parameters such as Young's moduli. As a result, by using machine learning-based regression analyses, these types of parameters such as a component composition can be determined (in Non Patent Literature 5, alcohol concentrations are determined as examples).

Next, identification of granular materials including nanoparticles, micro-particles, and powders using a powdery solid (granular material including nanoparticles, micro-particles, and powders) as a receptor material will be described, in which the identification was performed using a technique of performing pattern recognition of the detected signal obtained using the MSS. Note that in Examples described below, unless otherwise stated, the structure and operation of an MSS used, sources of a probe gases, an apparatus configuration and procedure for obtaining the detected signal indicating gas-solid interactions, analysis techniques for obtained datasets (LDA and PCA), and the like are similar to those in the above-described Examples relating to identification of a polymer. In this following Example, however, data points themselves at 0.5 second intervals are used for feature value extraction, while the other Example extracted the feature values by determining the slope of a response signal waveform as described with reference to FIG. 2. That is, this Example set a baseline of the waveform to 0 V, and, on the waveform thus processed, extracted the values of data points at 0.5 seconds, 1 second, and 1.5 seconds from a time when the signal started to decay as the feature values.

Three kinds of rice flour produced in different production areas were used as the granular material including nanoparticles, micro-particles, and powders. Specifically, rice produced in Hokkaido (variety: Koshihikari), rice produced in Yamagata Prefecture (Yamagata-ken) (variety: Haenuki) (wash free rice), and rice produced in Ibaraki Prefecture (Ibaraki-ken) (variety: Koshihikari) were each ground into powder with an agate mortar and dispersed in water. Each of the dispersions was coated onto each channel of an MSS.

Using vapor of ethanol and water vapor obtained by using ultrapure water as probe gases, the detected signal indicating gas-solid interactions was obtained from the MSS for each combination of the two kinds of probe gas with the three kinds of rice flour.

Figure 12:
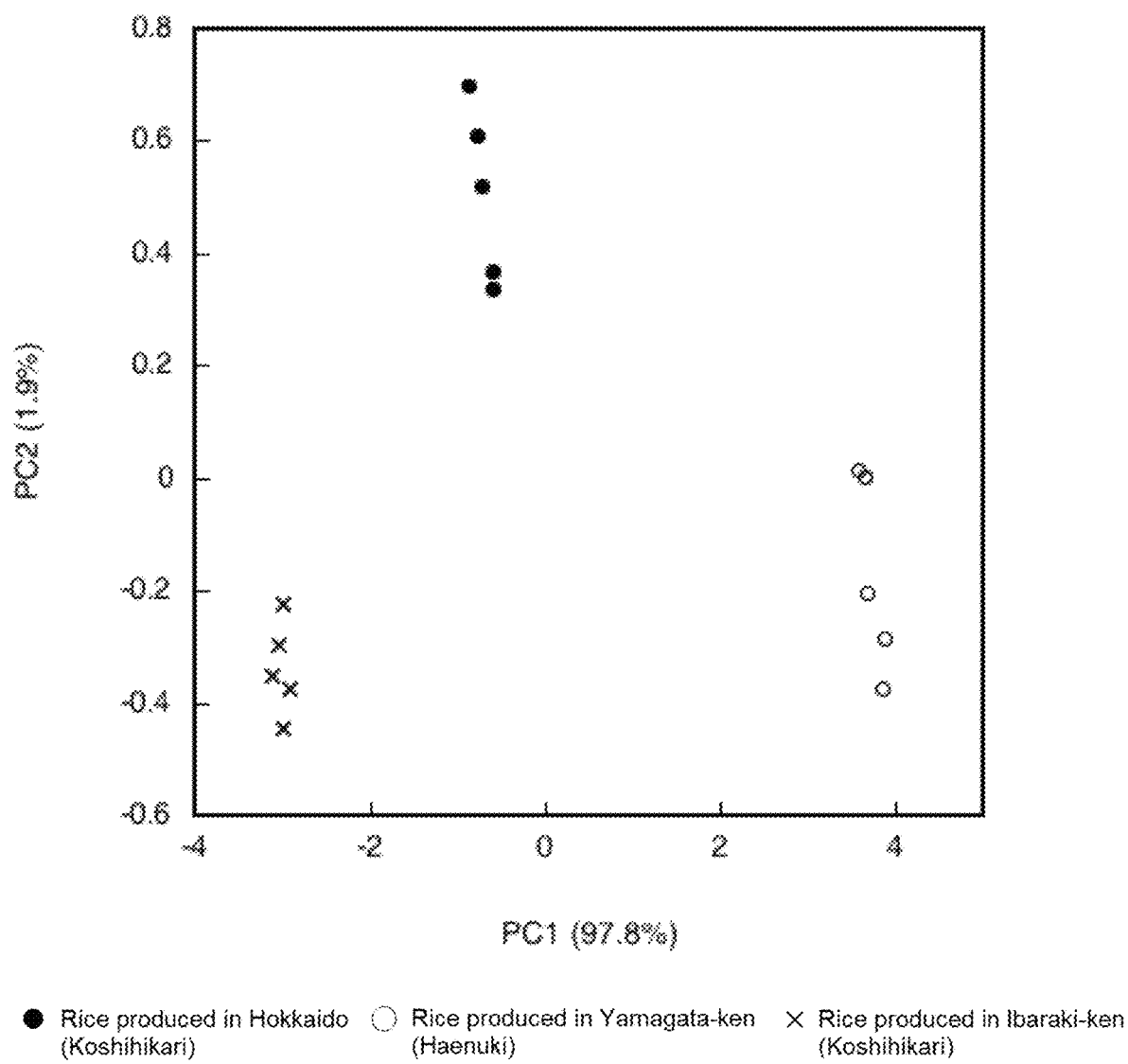
FIG. 12 is a diagram illustrating distinguishment among three kinds of rice (rice flour) with different combinations of varieties and production areas.

PCA results for the obtained datasets are illustrated in FIG. 12. As illustrated in FIG. 12, by using all the feature values from the two kinds of probe gases, three kinds of rice (rice flour) having different combinations of varieties and production areas could be clearly distinguished from each other by means of PCA. This more specifically indicates feasibility of distinguishing solid materials by means of pattern recognition according to the present invention. In addition, the fact that a slight difference such as a difference between rice varieties that are closely related genealogically (Haenuki is a second-generation hybrid between Koshihikari and the rice of the different breed) or a difference in cultivation condition such as a production area between rice of the same variety could be clearly distinguished by means of pattern recognition indicates that by choosing a couple appropriate probe gases, the pattern recognition according to one aspect of the present invention can also be effectively applied to solid materials to identify each analyte even with extremely slight differences in chemical and physical properties (more generally, not only solid but also any material that can be used as a receptor). In addition, by performing machine learning-based analysis (refer, for example, to Non Patent Literature 5) using a combination of the detected signal of a chemical sensor obtained by the present invention and other indices (for example, in the case of rice described above, an index and an evaluation value related to taste such as sugar content), it is expected that various indices related to each analyte can be estimated more easily.

INDUSTRIAL APPLICABILITY

As described in detail above, according to the present invention, by using a technique of pattern recognition, it is possible to identify specimens with accuracy of 100% in some specific combinations of probe gases. As demonstrated by means of SVM as well as PCA and LDA, even slight differences in material properties such as molecular weight can be distinguished by means of the present invention. In the present invention, any kind of gaseous or volatile molecules can be utilized as a probe for identifying a solid material and the like. Therefore, the present invention has an extremely high potential to differentiate solid materials and the like from each other. The solid materials and the like that can be a target of the measurement in the present invention include, but are not limited to, inorganic nanoparticles, functional organic materials, and biomolecules such as peptides, proteins, and nucleic acids. Nanomechanical sensors provide a detection platform for many applications, and this makes analysis of almost all kinds of solid specimens possible. The present invention is not limited to nanomechanical sensors but can be expanded to a variety of chemical sensors. Moreover, the present invention is also be effective in the industrial phase, and in this case, the quality and performance of sensor receptors can be quantitatively evaluated.

CITATION LIST

Patent Literature

Patent Literature 1: WO 2011/148774 A

Non Patent Literature

Non Patent Literature 1: G. Yoshikawa, T. Akiyama, F. Loizeau, K. Shiba, S. Gautsch, T Nakayama, P. Vettiger, N. Rooij and M. Aono. Sensors, 2012, 12, 15873-15887.

Non Patent Literature 2: Vapnik, V. Estimation of Dependences Based on Empirical Data [in Russian], Nauka, Moscow, 1979 [English translation], Springer, New York, 1982.

Non Patent Literature 3: T. Nowotny, A. Z. Berna, R. Binions, S. Trowell, Sens. Actuators B Chem., 2013, 187, 471-480.

Non Patent Literature 4: G. Yoshikawa, Appl. Phys. Lett., 2011, 98, 173502.

Non Patent Literature 5: K. Shiba, R. Tamura, G. Imamura and G. Yoshikawa, Sci. Rep., 2017, 7, 3661.

The invention claimed is:

1. A material analysis method for analyzing a material supported on a chemical sensor, the method comprising:
providing a chemical sensor with a material to be measured supported thereon, wherein the material to be measured coats a sensor body of the chemical sensor to form a receptor layer,
supplying at least one probe fluid to the chemical sensor having the receptor layer, and
analyzing the material to be measured based on a signal output from the chemical sensor based on a change in a physical parameter induced by an interaction between the at least one probe fluid and the material to be measured in the receptor layer, the interaction being induced by sorption or adsorption of the at least one probe fluid to the material to be measured supported on the chemical sensor by the supplying of the at least one probe fluid,
wherein the analysis is at least one selected from the group consisting of to distinguish whether or not the material to be measured is the same as another material; to identify the material to be measured; and to determine a quantity of a desired component in the material to be measured.

2. The material analysis method according to claim 1, wherein the physical parameter is one or more selected from the group consisting of surface stress, stress, force, surface tension, pressure, mass, elasticity, Young's modulus, Poisson's ratio, resonance frequency, frequency, volume, thickness, viscosity, density, magnetic force, magnetic quantity, magnetic field, magnetic flux, magnetic flux density, electric resistance, electric quantity, dielectric constant, electric power, electric field, charge, current, voltage, potential, mobility, electrostatic energy, capacitance, inductance, reactance, susceptance, admittance, impedance, conductance, plasmon, refractive index, luminous intensity, and temperature.

3. The material analysis method according to claim 1, wherein the analysis is performed based on a result of extracting a feature value from the signal output from the chemical sensor.

4. The material analysis method according to claim 1, wherein the at least one probe fluid and a purging fluid are alternately supplied to the chemical sensor having the receptor layer.

5. The material analysis method according to claim 1, wherein at least one of the at least one probe fluid supplied is a gas.

6. The material analysis method according to claim 1, wherein at least one of the at least one probe fluid supplied is a liquid.

7. The material analysis method according to claim 5, wherein at least one of the at least one gas is a vapor produced from a volatile substance.

8. The material analysis method according to claim 1, wherein the material to be measured is analyzed by subjecting the signal output from the chemical sensor to machine learning.

9. The material analysis method according to claim 1, wherein the material to be measured is analyzed by subjecting the signal output from the chemical sensor to multivariate analysis.

10. The material analysis method according to claim 9, wherein the material to be measured is analyzed by applying principal component analysis or linear discriminant analysis to the signal output from the chemical sensor.

11. The material analysis method according to claim 9, wherein the material to be measured is analyzed by applying pattern recognition to the signal output from the chemical sensor.

12. The material analysis method according to claim 11, wherein the pattern recognition is a support vector machine.

13. A material analysis apparatus comprising a chemical sensor, and an analysis means that analyzes the detected signal output from the chemical sensor so that the material analysis apparatus performs the material analysis method according to claim 1.

* * * * *